Dec. 27, 1932.  B. REGEL  1,892,633
MACHINE FOR DIVIDING AND WORKING DOUGH
Filed March 20, 1931  2 Sheets-Sheet 1
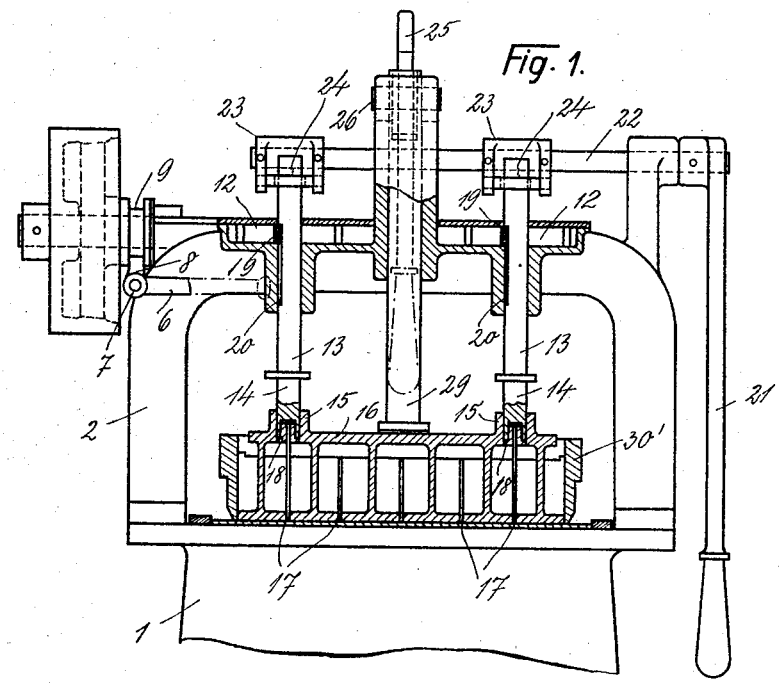
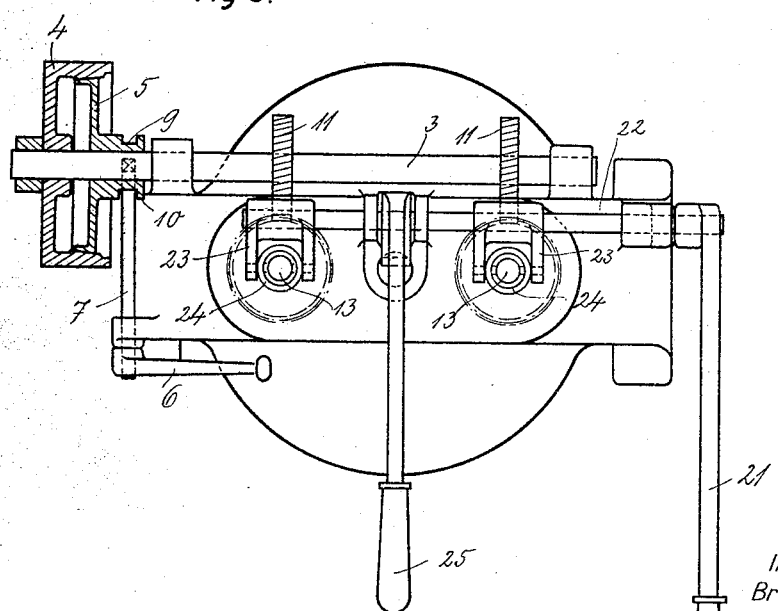
Inventor
Bruno Regel
By
Attorney Dec. 27, 1932.  B. REGEL  1,892,633
MACHINE FOR DIVIDING AND WORKING DOUGH
Filed March 20, 1931   2 Sheets-Sheet 2
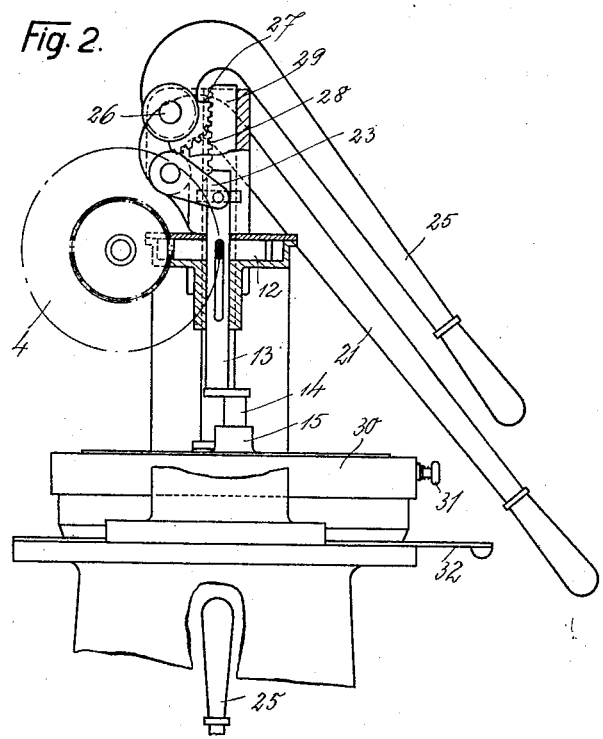
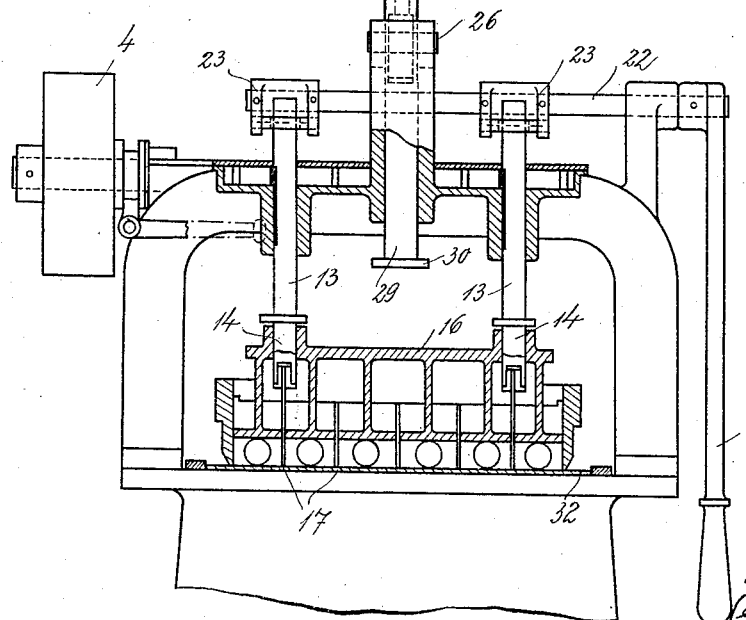
Inventor:
Bruno Regel
By
Conway Cox
Attorney Patented Dec. 27, 1932

1,892,633

UNITED STATES PATENT OFFICE

BRUNO REGEL, OF HALLE-ON-THE-SAALE, GERMANY, ASSIGNOR TO HERM. BERTRAM, HALLESCHE DAMPFBACKOFEN-FABRIK HALLESCHE MISCH-U. KNETMASCHINEN-FABRIK M. B. H., OF HALLE-ON-THE-SAALE, GERMANY

MACHINE FOR DIVIDING AND WORKING DOUGH

Application filed March 20, 1931, Serial No. 524,123, and in Germany March 21, 1930.

My invention relates to machines for dividing and working dough, in which a batch of dough is firstly divided into a number of single portions which are then subjected to a working operation similar in effect to the customary kneading or rolling by hand.

In order to obtain worked pieces which in the fermentation may fully rise or swell and so result in a not dense light and well raised baked ware, the machine must be of such a construction that the pieces of dough can increase in volume during the working operation and that they are at least during the last working movements in touch with the upper working plate for smoothing and polishing their surfaces.

To fulfill these conditions it has been proposed to counter-balance the upper press plate of the dough working device during the working operation by means of a counter-weight.

The object of the invention consists in simplifying these known machines. The invention is characterized in that the press plate giving the necessary room for the rising or swelling of the dough pieces is made of a material of low specific weight, for instance of aluminium, an aluminium alloy or a magnesium alloy such as electron. This brings about the effect that all the parts or members necessary to counter-balance the weight of the press plate can be dispensed with. Another advantage of the light weight of the press plate is a considerable reduction of the masses of the machine to be moved in the dividing and working operation so that the amount of energy necessary for moving these parts is remarkably reduced and the vibrations of the machine become smaller. The machine, therefore, can be of lighter construction as heretofore or is more rigid than heretofore when built with equal dimensions.

A further object of my invention is to simplify the construction of the machine by means of a special arrangement of the members driving and guiding the upper press plate and the dividing knives of the dough dividing and working device. This simplification of the construction is obtained firstly by providing in the machine a pressing stamp or piston above the upper press plate having no positive connection with the plate. This stamp or piston can be lowered into touch with the press plate in order to press the dough before dividing and can be raised after the pressing operation without raising the press plate. This simple arrangement is possible on account of the light weight of the upper press plate. This light weight allows the dough pieces to raise the upper press plate by their own swelling power or tension.

A further object of my invention is a combined driving and guiding mechanism for the cutting and pressing and working mechanism. This combined driving and guiding mechanism consists in vertically arranged crank shafts being rotatable to drive the parts in the working operation and being able to be raised and lowered with the dividing knives for the cutting operation. The upper press plate is guided on the crank pins of these shafts in such a manner, that it can be raised and lowered relatively to the crank pins for pressing the dough and for allowing the dough pieces to raise in the working operation and that it can be driven by the crank pins on circular paths together with the dividing knives during working operation.

In the accompanying drawings an embodiment of a dough dividing and working machine is illustrated as an example according to my invention.

Fig. 1 shows partly in section and partly in front elevation the main working part of the machine.

Fig. 2 is a side elevation.

Fig. 3 is a plan of the machine.

Fig. 4 shows a similar view of the machine as Fig. 1 with the parts in the position at the end of the working operation.

On the machine frame 1 is secured a bail or yoke 2 carrying the main driving shaft 3; on the outer end of the driving shaft is rotatably mounted a pulley 4 forming one member of a clutch, the other member of the clutch being a conical disc 5 mounted slidably but nonrotatably on shaft 3. The disc 5 may be shifted into and out of driving position by means of a hand lever 6, a rock shaft 7 and an arm 8 engaging a ring nut 9 in the hub 10 of disc 5.

On the shaft 3 are rigidly mounted two screw wheels 11 meshing with other screw wheels 12 on vertical shafts 13 with cranks 14 at their lower ends. The cranks 14 engage eyes or sockets 15 on the upper press plate 16 and go through these eyes or sockets, so that the press plate can be driven by the cranks 14 on circular gyratory paths, but can be raised up and down on the crank pins.

To the under end of the crank pins 14 are fastened the crosswise interconnected dividing knives 17, so that also these knives can be driven on circular gyratory paths by means of the shafts 13. The knives are connected to the shafts by cylindrical parts 18 inserted into the crank pins 14, so that they can rotate in the crank pins but can not be moved axially to the crank pins.

The shafts 13 are connected to screw wheels 12 by means of keys 19 and grooves 20, so that the shafts can be moved up and down in the wheels 12. This up and down movement can be effected by means of a lever 21, a rock shaft 22 and arms 23 being rotatably but not slidably connected to shafts 13 by means of rings 24. If lever 21 is moved up and down, also shafts 13 are moved up and down and raise and lower the knives 17 for dividing dough.

A second hand lever 25 is rockable on a stud 26. The lever 25 has rigidly connected thereto a toothed arc 27 engaging a rack 28 cut into the upper part of a stamp or piston 29 in order to raise or lower the stamp or piston 29. The under end 30 of the piston 29 can be set on or removed from the press plate 16 in order to press the dough or to free the plate from the pressing power, so that it can rise during the working operation carried by the swelling dough balls.

The knives 17 and the press plate 16 are surrounded in usual manner by means of a mantle ring 30'. The ring 30' can be connected with or disconnected from the knives by means of a coupling bolt 31.

The operation of the machine is as follows:

By moving the pressing lever 25 downwards the stamp 29 is pushed against the upper surface of the press plate 16 which thereby is moved downwards. The batch of dough on the dough supporting plate 32 is then pressed. At the same time the knives 17 are moved; these knives in their uppermost position before the beginning of the press process lie in the same plane as the upper press plate 16. After pressing, the knives 17, by moving the lever 21, are moved downwards until the knives come into touch with the dough plate 32. Then the dough is divided. After the dividing operation the pressing lever 25 is moved back into its initial position. The upper press plate 16 remains in touch with the divided dough pieces.

By turning the lever 25 in its initial position, the pressure on the press plate 16 is released, so that only the weight of the press plate rests on the dough pieces.

Now the working operation begins. To this end the clutch 4, 5 is closed by means of the hand lever 6. Thereby the crank shafts 13 are turned by means of the drive shaft 3 and the gears 11, 12. The upper plate 16 with the knives 17 will therefore be set into a circular movement, i. e. the working operation takes place.

The increasing dough pieces now raise the press plate 16 which can move upwards sliding on the cranks 14. The knives 17, however, remain still in their lowest position above the dough plate 32.

The plate 16 being, according to the invention, of a material as light as possible does not materially interfere with the rising of the dough pieces and offers so little resistance that they may expand freely in an upward direction. Thereby they are in constant touch with the plate 16 so that they will be smoothed and polished. As a material for the press plate 16 may be employed preferably aluminium or magnesium alloys such as electron metals or other metals of small specific weight.

After the working operation, the dividing lever 21 is moved back whereby at first the knives 17 will be raised alone.

As soon as the under edges of the knives are again in the same plane with the under surface of the press plate 16 the knives abut against the top plate of the hollow press plate 16, and the latter is also raised and moved back into its initial position. The dough balls thereby have been freed so that the dough plate 32 can be removed with the dough balls.

The guiding of the upper press plate on the drive shafts mounted in the machine frame simplifies the construction of the machine considerably.

The application of the invention is independent of whether the working movements are imparted to the dividing knives with the mantle ring and upper press plate or to the table supporting the dough plate 32. In the latter case, it will not be necessary to use the shafts 13 as driving means but as guiding means only, because then the bolts will make vertical only but no rotary movements.

What I claim is:—

1. In a machine for dividing and working dough, a support for the dough, a dividing and working head comprising a set of dividing knives and a press plate, means for moving said dividing and working head in a defined path in a horizontal plane, means for raising and lowering said working head, said press plate being free with respect to said raising and lowering means to move upwardly or downwardly within certain limits, said press plate being of a specifically light material.

2. In a machine according to claim 1, the specifically light material being a magnesium-aluminum alloy.

In testimony whereof I affixed my signature.

BRUNO REGEL.